(12) United States Patent
Zee

(10) Patent No.: US 7,194,490 B2
(45) Date of Patent: Mar. 20, 2007

(54) METHOD FOR THE ASSURED AND ENDURING ARCHIVAL OF INTELLECTUAL PROPERTY

(76) Inventor: Christopher Zee, 6948 Leaside Drive SW, Calgary, Alberta (CA) T3E 6H5

( * ) Notice: Subject to any disclaimer, the term of this patent is extended or adjusted under 35 U.S.C. 154(b) by 798 days.

(21) Appl. No.: 09/864,038

(22) Filed: May 22, 2001

(65) Prior Publication Data

US 2002/0178015 A1  Nov. 28, 2002

(51) Int. Cl.
G06F 12/00 (2006.01)
G06F 17/60 (2006.01)
G06F 17/30 (2006.01)

(52) U.S. Cl. .............................. 707/204; 705/1; 707/10

(58) Field of Classification Search .................... 707/1, 707/3, 5, 10, 100, 204; 705/29, 32, 1, 22, 705/28, 35
See application file for complete search history.

(56) References Cited

U.S. PATENT DOCUMENTS

| | | | |
|---|---|---|---|
| 5,758,057 A * | 5/1998 | Baba et al. ..................... 714/7 |
| 5,813,009 A * | 9/1998 | Johnson et al. ............. 707/100 |
| 5,893,908 A * | 4/1999 | Cullen et al. ................... 707/5 |
| 5,897,635 A | 4/1999 | Torres et al. |
| 5,907,836 A | 5/1999 | Sumita et al. |
| 5,963,951 A | 10/1999 | Collins |
| 5,999,966 A | 12/1999 | McDougall et al. |
| 6,014,668 A | 1/2000 | Tabata et al. |
| 6,026,403 A | 2/2000 | Siefert |
| 6,044,372 A | 3/2000 | Rothfus et al. |
| 6,058,428 A | 5/2000 | Wang et al. |
| 6,061,681 A | 5/2000 | Collins |
| 6,067,571 A | 5/2000 | Igarashi et al. |
| 6,070,158 A | 5/2000 | Kirsch et al. |
| 6,092,090 A | 7/2000 | Payne et al. |
| 6,092,091 A | 7/2000 | Sumita et al. |
| 6,119,117 A | 9/2000 | Yoda et al. |
| 6,131,096 A | 10/2000 | Ng et al. |
| 6,151,606 A | 11/2000 | Mendez |
| 6,151,609 A | 11/2000 | Truong |
| 6,155,840 A | 12/2000 | Sallette |
| 6,157,947 A * | 12/2000 | Watanabe et al. ............ 709/217 |
| 6,161,107 A | 12/2000 | Stern |
| 6,163,782 A | 12/2000 | Singhal |
| 6,181,867 B1 | 1/2001 | Kenner et al. |
| 6,185,573 B1 | 2/2001 | Angelucci et al. |
| 6,192,398 B1 | 2/2001 | Hunt |
| 6,223,165 B1 | 4/2001 | Lauffer |
| 6,263,121 B1 * | 7/2001 | Melen et al. ................ 382/305 |

(Continued)

OTHER PUBLICATIONS

ISBN 0-07-882549 filed 1998, Jason Couchman.*

(Continued)

*Primary Examiner*—John R. Cottingham
*Assistant Examiner*—Kuen S. Lu
(74) *Attorney, Agent, or Firm*—Sean W. Goodwin

(57) ABSTRACT

A technical and commercial method of managing information is provided including an endowment fund associated with each of the plurality of information or intellectual property (IP) to be archived. The endowment fund assures the maintenance and storage of the archived IP. Further, the endowment fund is managed separately from the user fees to ensure its enduring integrity and long term viability, with the user fees being applicable to user's access to the IP through an electronic communications network. Endowment funds for archived IP can be pooled for increased permanence. User's access to the archived IP can be managed including assignment of an access level and a cost for access. Users can access and amend a value-added access file associated with, yet separate from, the archived IP.

21 Claims, 16 Drawing Sheets

U.S. PATENT DOCUMENTS

| | | | |
|---|---|---|---|
| 6,012,035 A1* | 1/2002 | Freeman et al. | 705/2 |
| 6,442,538 B1* | 8/2002 | Nojima | 707/1 |
| 6,463,426 B1* | 10/2002 | Lipson et al. | 707/3 |
| 6,574,629 B1* | 6/2003 | Cooke et al. | 707/10 |
| 6,592,629 B1* | 7/2003 | Cullen et al. | 715/530 |
| 2001/0034617 A1* | 10/2001 | Kimata | 705/3 |
| 2001/0034695 A1* | 10/2001 | Wilkinson | 705/37 |
| 2001/0042037 A1* | 11/2001 | Kam et al. | 705/36 |
| 2002/0023083 A1* | 2/2002 | Durkalski | 707/3 |
| 2002/0112235 A1* | 8/2002 | Ballou et al. | 725/25 |
| 2003/0167175 A1* | 9/2003 | Salom | 705/1 |

OTHER PUBLICATIONS

Oracle DBA Certification Exam Guide, J. Couchman, Oracle Press, 1998.*

Oracle DBA Cerification Exam Guide, J. Couchman, Oracle Press, 1998.*

Will the real VLDB conference please stand up, pp. 8-14, ACM SIGMOD Record, vol. 12, issue 3, Apr. 1982.*

* cited by examiner

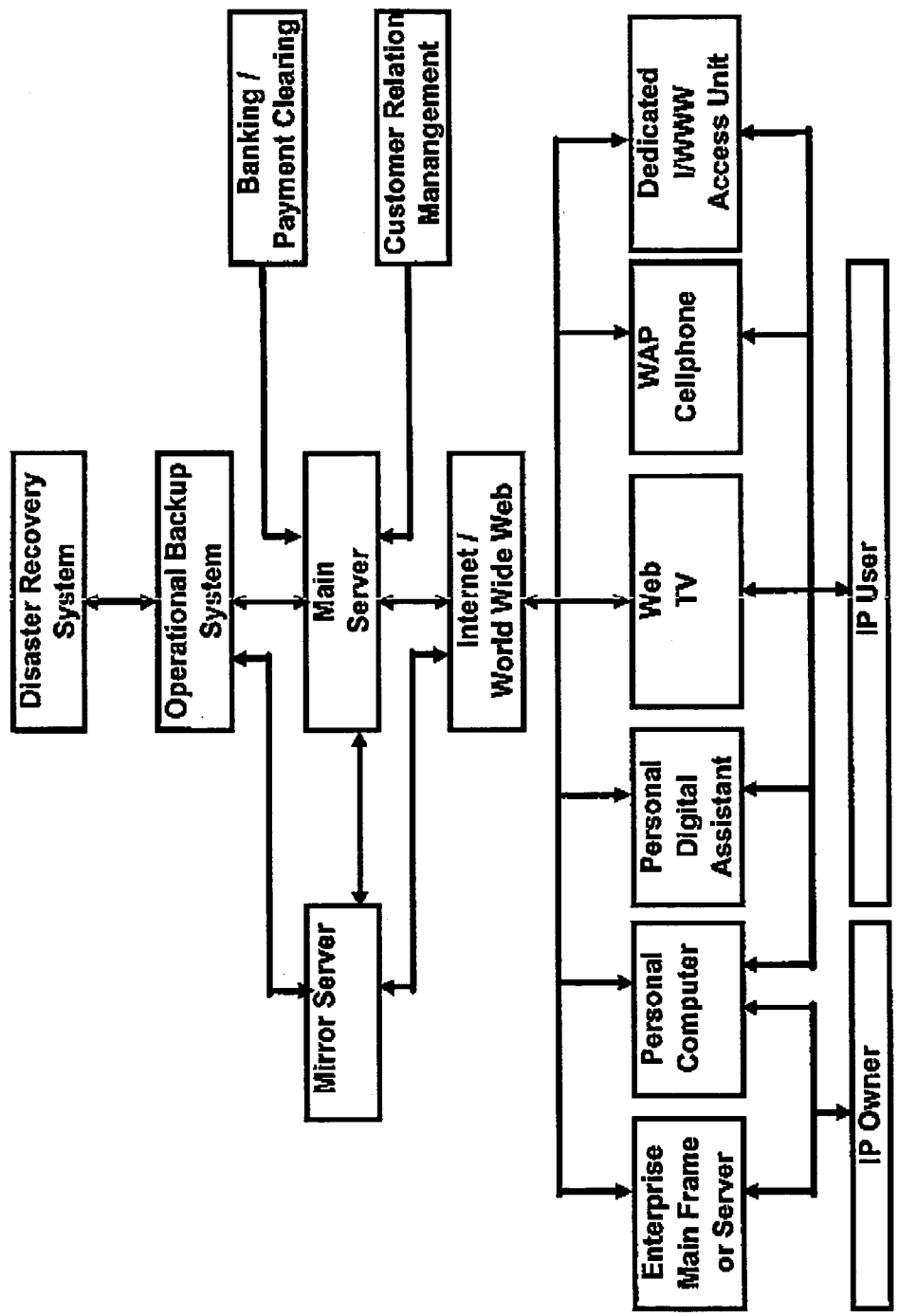

Figure 2
View of IP Index Tag Input Screen

| Field | Input |
|---|---|
| IP Type | [dropdown] |
| Country of Publication | [dropdown] |
| Author Name (A) | [text] |
| Copyright Holder Name (B) | [text] |
| Revenue Sharing Ratio (A:B) | [dropdown] |
| Bank Account Information to Receive Revenue | [text] |
| Keywords | [text] |
| Abstract (max 150 words) | Click for notepad |
| Exerpts (max 300 words) | Click for notepad |
| ISBN / ISSN Number | [text] [text] |
| Publication Date | [text] |
| Volume / Issue Numbers | [text] [text] |
| Section | [text] |
| Page Number | [text] |
| File Format | [dropdown] |
| File Size | [text] KB |
| Rating: Language | [dropdown] |
| Violence | [dropdown] |

[ OK ] [ CANCEL ] [ HELP ]

IP Owner's Submission of IP

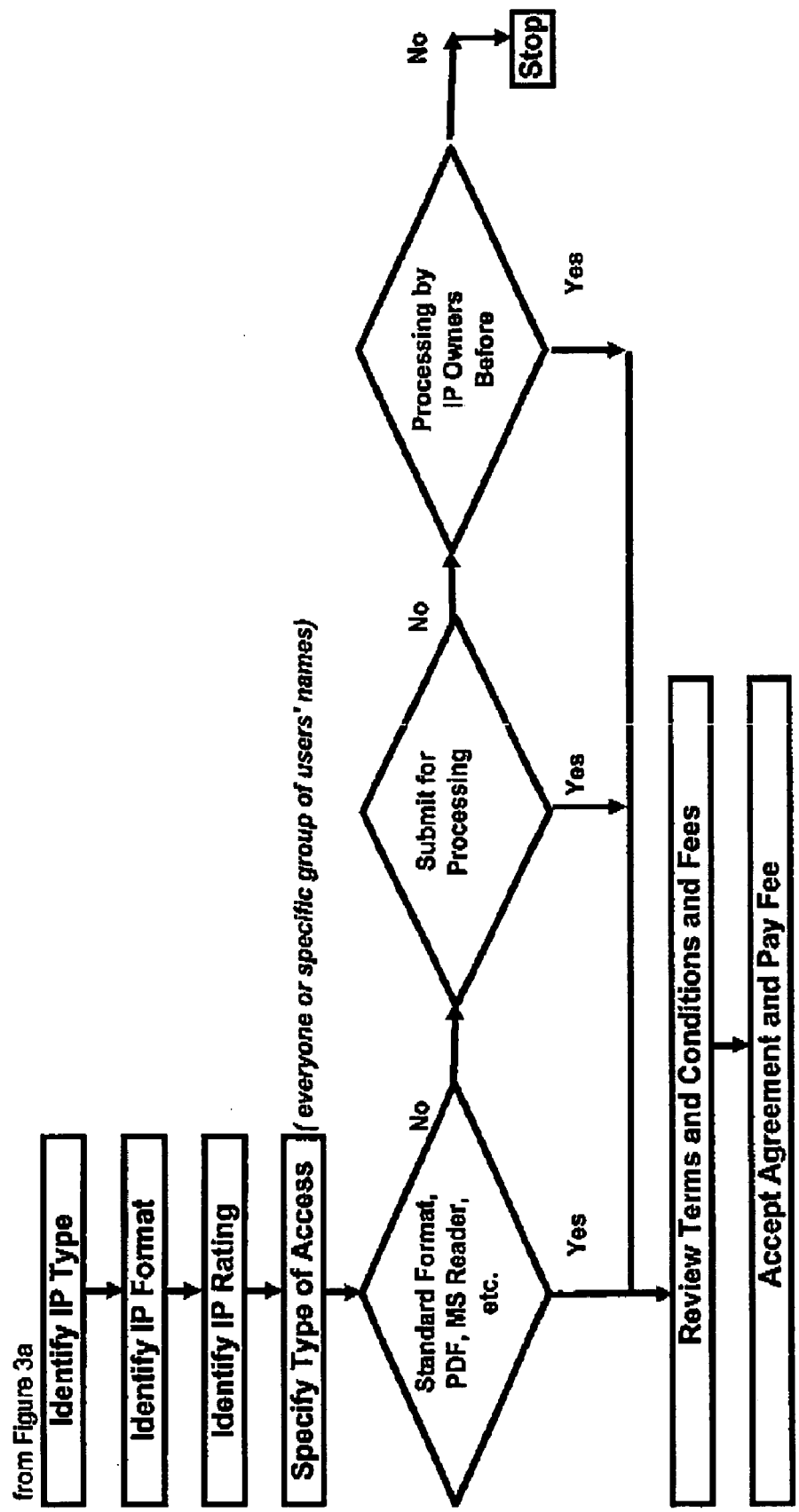

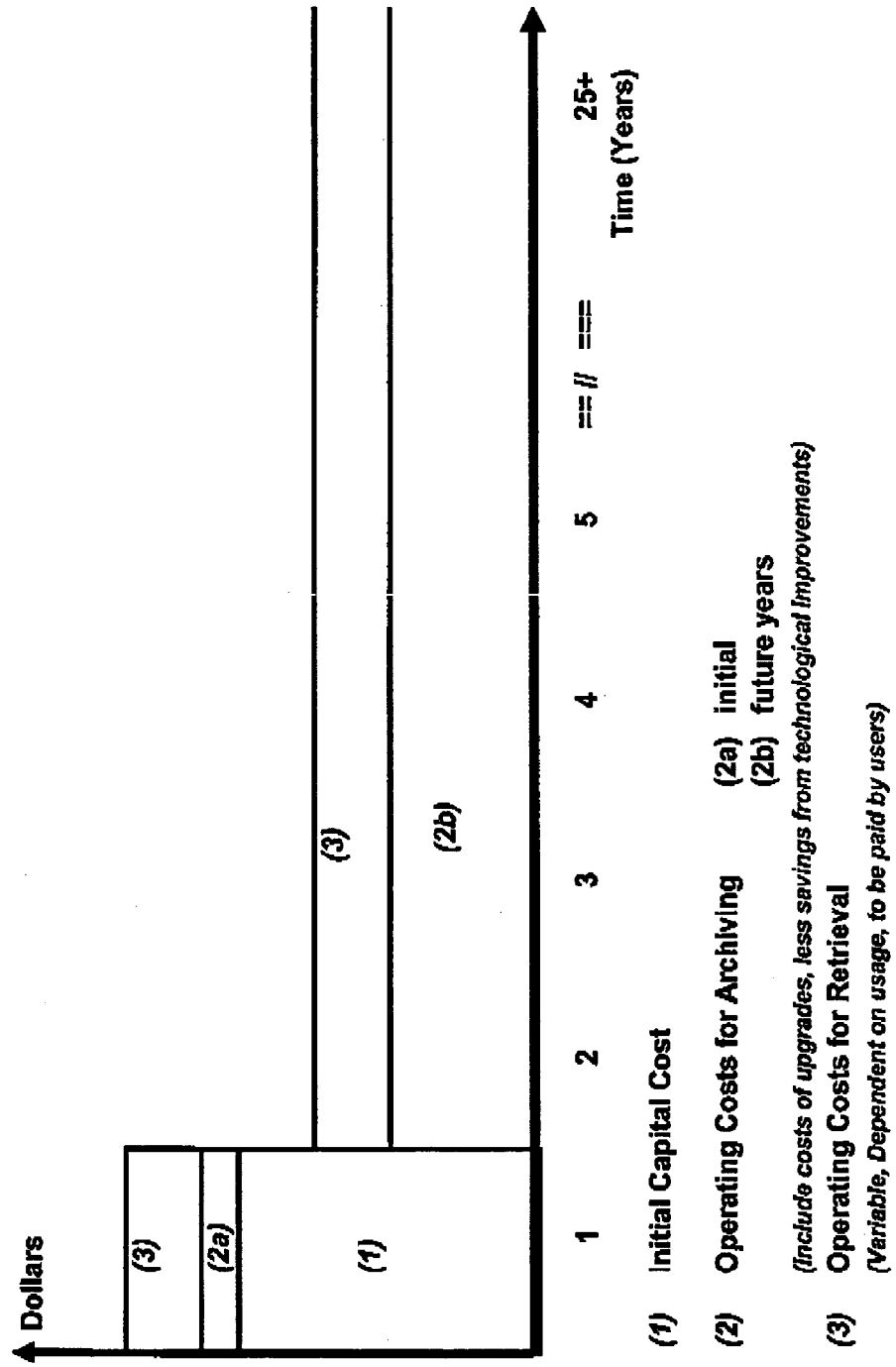

Figure 5
Endowment Fund (Part 2)
Archiving Fee Payable by IP Owner Members of 'Permanent IP Domain'

Total Archiving Fee = A + B

A    Initial Capital Costs = (1) from Figure 4

B    Endowment fund for initial and future years of operating costs
= (2a) + (2b) from Figure 4
(may be reduced by subsidies from charitable funding)

*Example:* *If perpetual annuity rate is 5%, endowment fund is 20 times that of the estimated annual storage operating costs.*

Figure 6
'Access File' Attributes

| Public Information | 'Access File' ID Code ** | |
| --- | --- | --- |
| | 'Access File' Name ** | |
| | Comments ** | |
| | 'Access File' Size | |
| | 'Access File' Generation | |
| | Permanent IP Address | |
| | IP Name | |
| | IP Type | |
| | IP Size | |
| | Level of Access | |
| | Folders Linked    ** | ▼ |
| | # of annotations | |
| | # of attached files | |
| Private Information | User ID | |
| | User Defined Keywords | ▼ |
| | Fee Paid | |
| | Purchase Date | |
| | Dates of Last Access | ▼ |

[OK]   [CANCEL]   [HELP]

** Note: Information input by the user. All other information is filled in by the system. Illustrative typical situation.

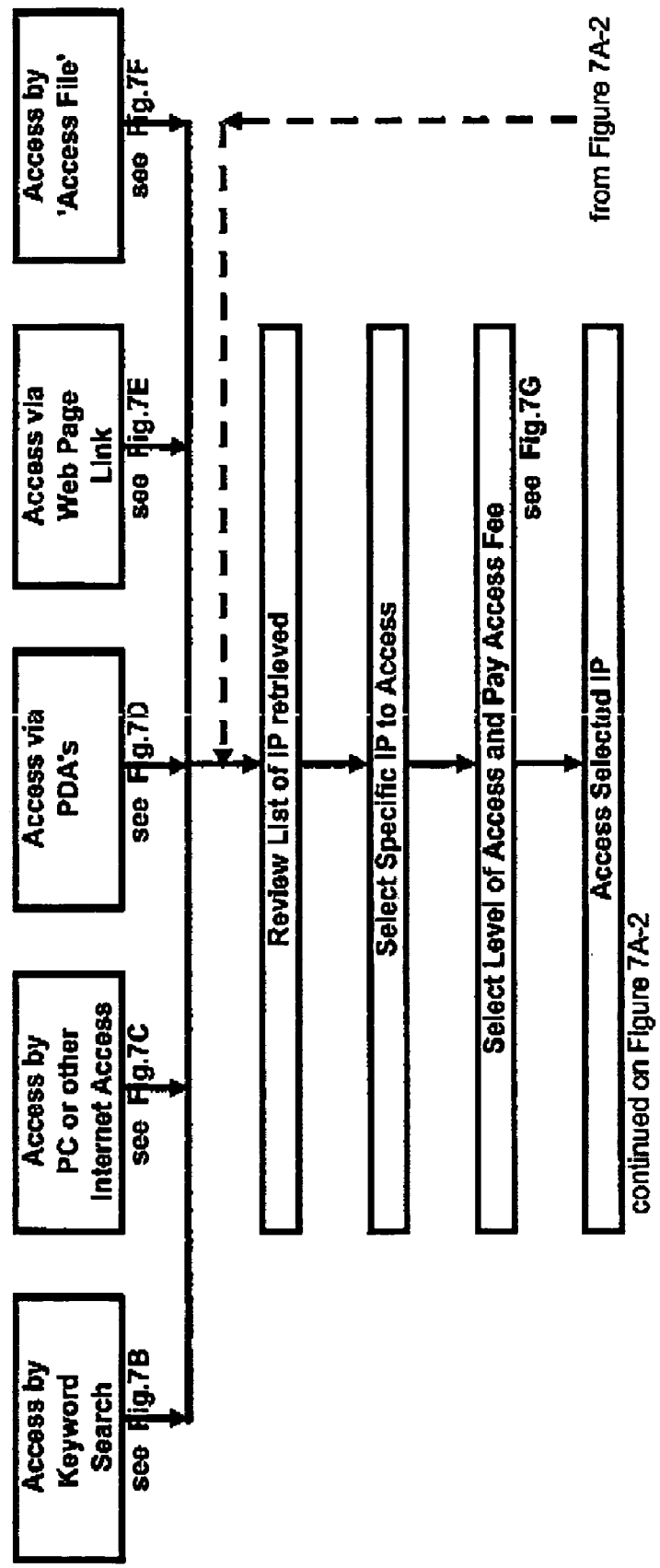

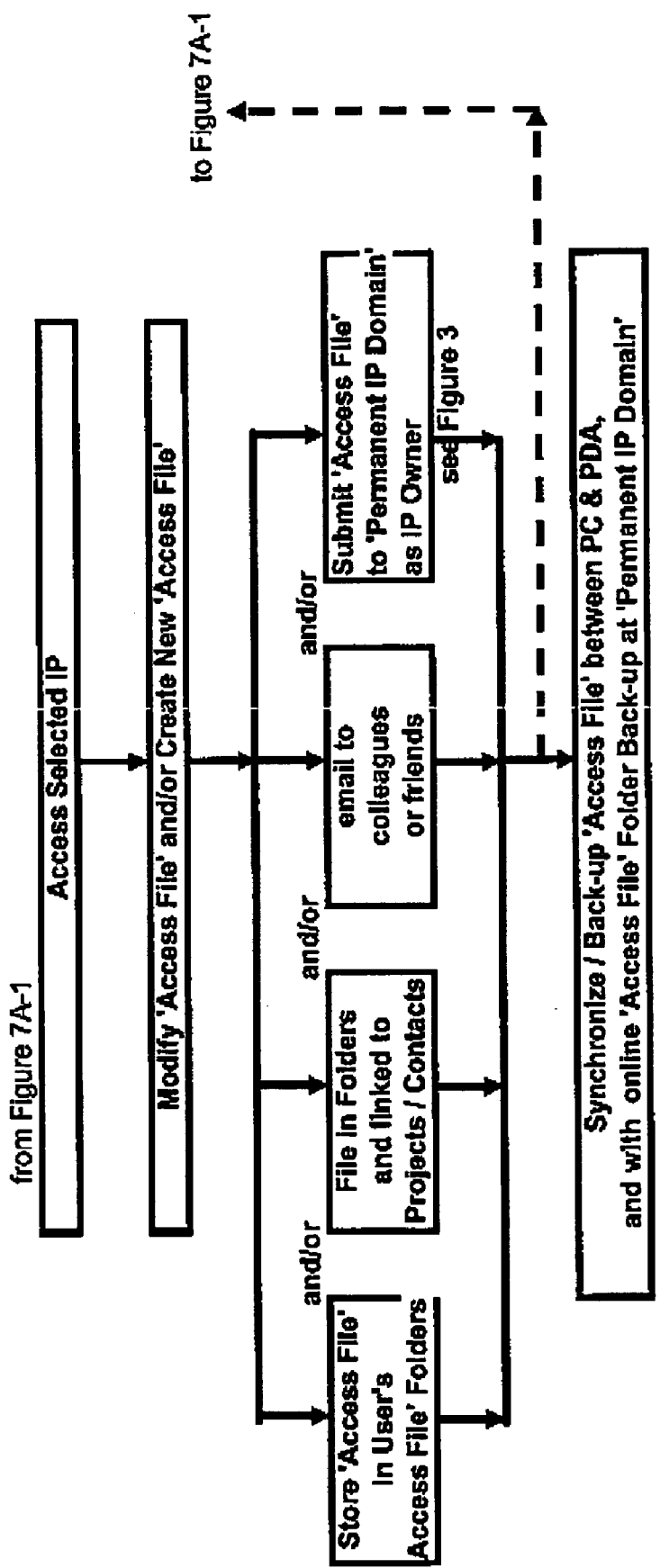

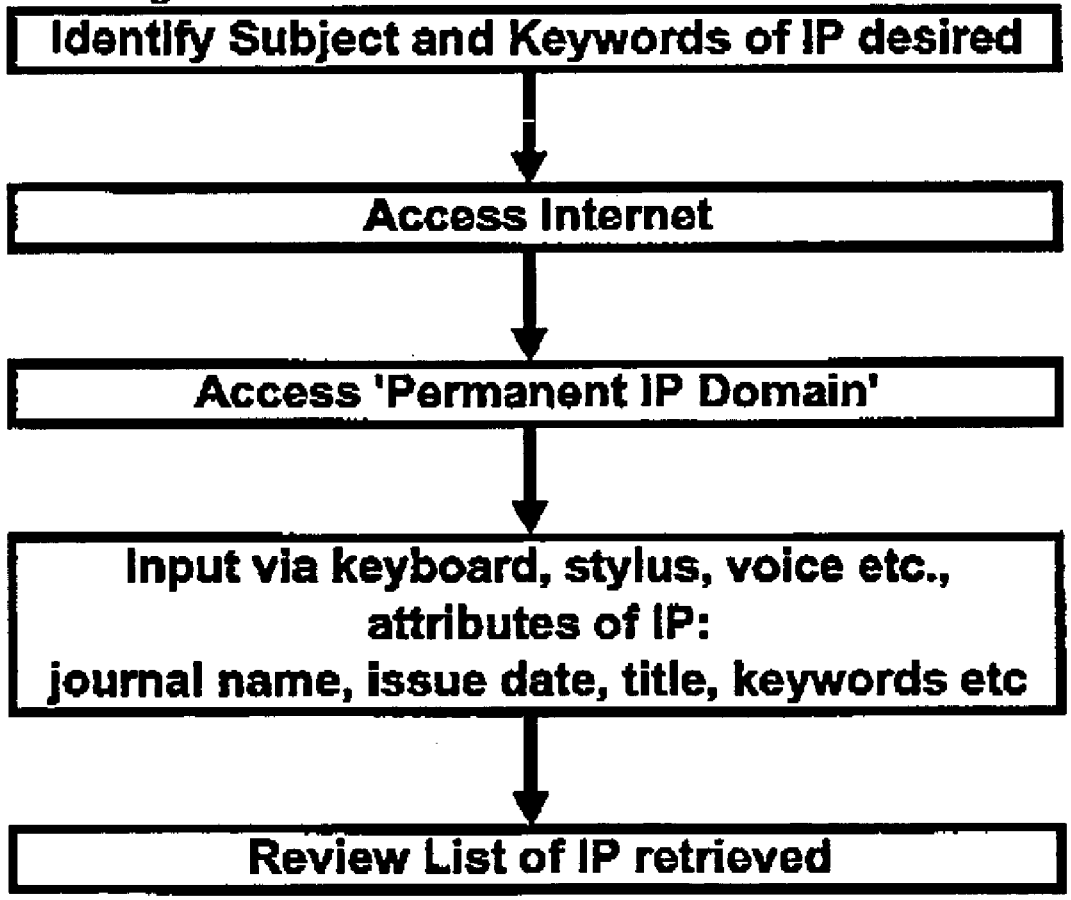

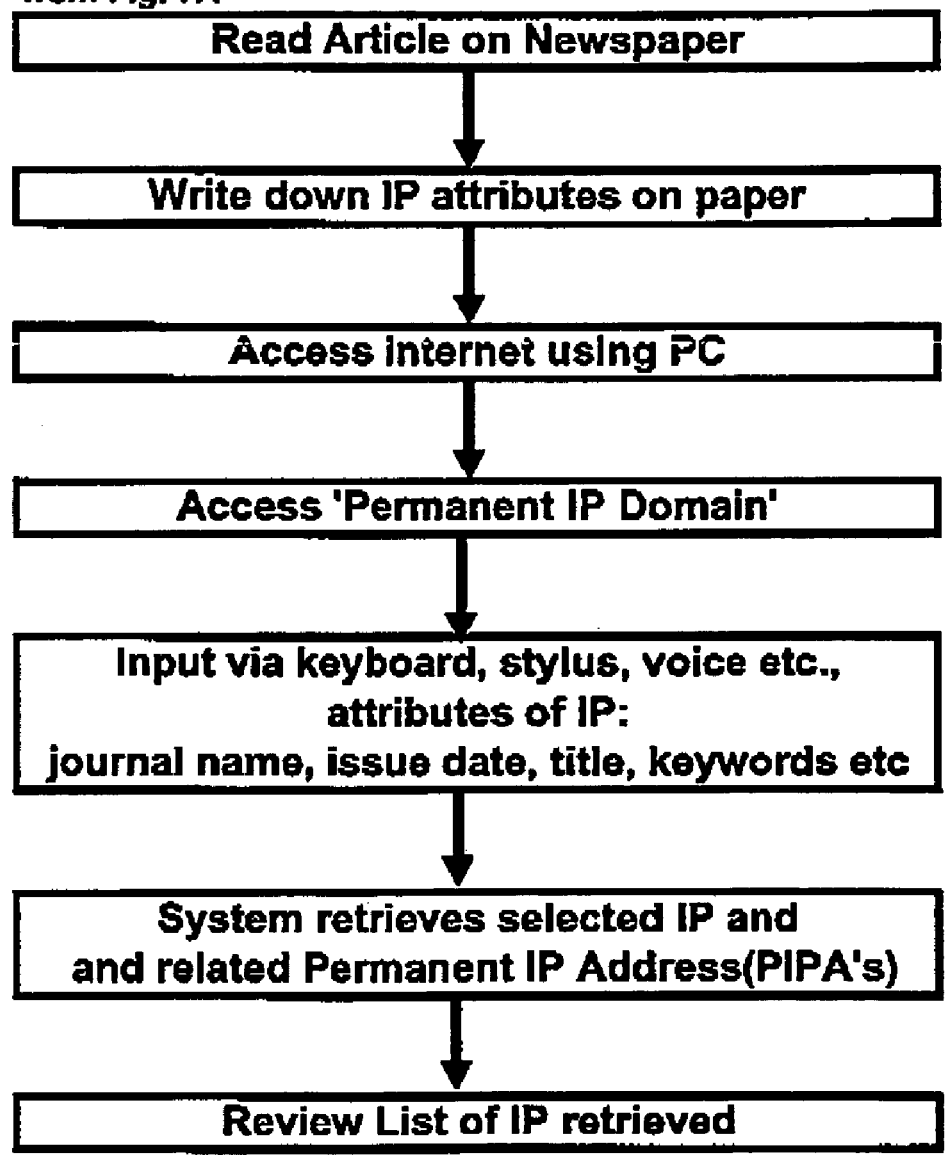

Access via PDA/PC Synchronization

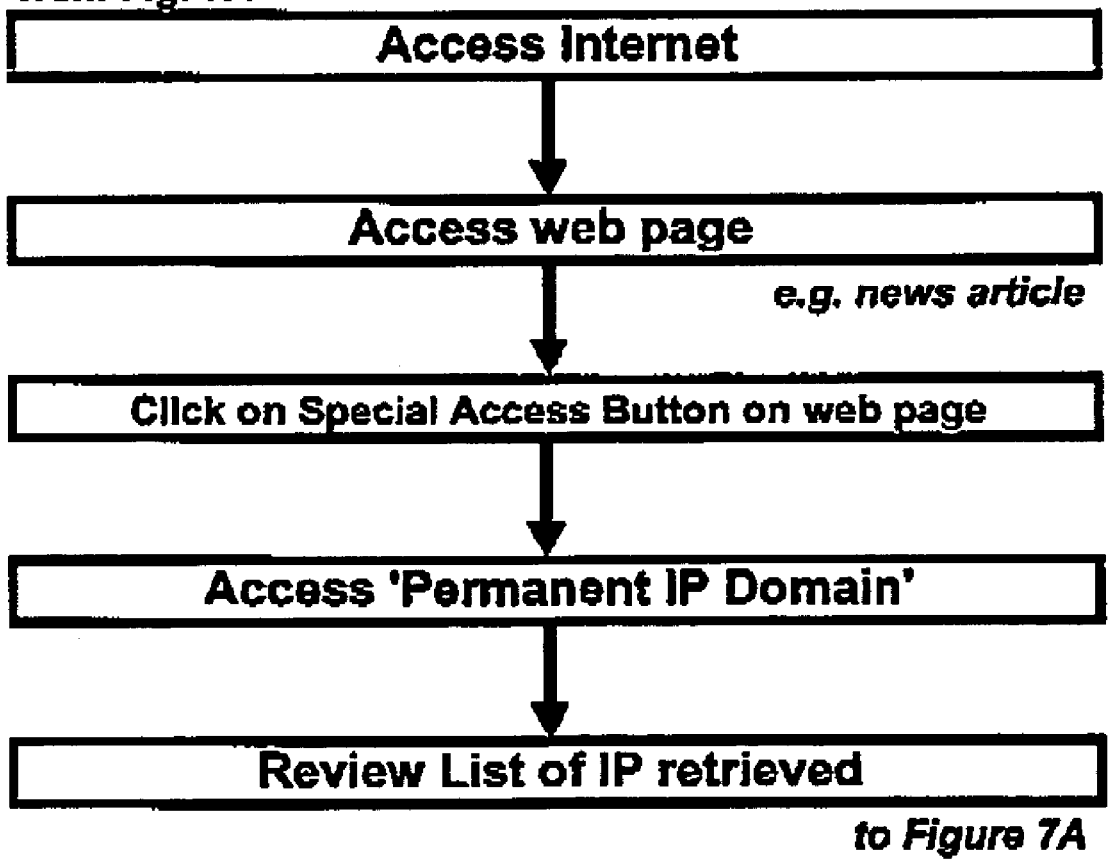

Access via 'Access File'

Select Level of Access and Pay Fees

Contents of 'Permanent IP Domain' in relation to the contents of Internet/World Wide Web and Proprietary Databases

METHOD FOR THE ASSURED AND ENDURING ARCHIVAL OF INTELLECTUAL PROPERTY

BACKGROUND OF THE INVENTION

1. Field of the Invention

This invention relates generally to methods and systems for information storage and retrieval and more particularly to specific methods and systems for improved archiving, retrieval, indexing and amending of Intellectual Property.

2. Description of Related Art

Intellectual property (IP) such as books, journals, magazines and newspapers entail high capital and operating costs for physical preparation and handling. The time lag between investment and sales revenue generation further increases the associated economic risk. Publishers, in most parts, publish only a small portion of works that are judged able to clear high economic hurdle. Even after being published, most written works have a limited shelf life given the high overhead costs. Most are then disposed of through discount and clearance channels. All these factors combine to limit the availability of IP to potential users. The use of the Internet or World Wide Web (I/WWW) to retail IP, such as books, journals, magazines, music compact discs (CD) and digital video discs (DVD), greatly increases the accessibility of these forms of IP. However, the problem of costly physical handling remains unsolved.

The introduction and wide spread use of mainframe computers, and later personal computers, in turn out the promise of a "paperless society", where most information is stored and retrieved electronically, thereby eliminating the need of paper copies. To date, this promise remains unfulfilled. The reasons are both technical and commercial. Technically, the main hurdles include: inconvenient access to information via machines, the slowness of viewing one page of information at a time on a computer screen, low display resolution, lack of portability and inability to easily annotate the information. Commercially, the higher initial capital and operating costs for both content providers and readers or users, and the lack of a definitive legal framework to deal with copyrights of electronic documents have caused only limited use of electronic storage and retrieval of information. This situation, most observed in printed documents, is also true for images and drawings, and to lesser extent, for sound recordings and movies or videos.

The many benefits of electronic information storage and access are therefore still not realized. Some of these benefits include: bringing vast amounts of content within reach of a large audience, significantly lower costs for physical production, storage and transportation, possible multiple simultaneous access, savings in energy and physical media, e.g., paper, and indirectly lower environmental pollution.

The rapid and almost unstructured evolution of the I/WWW has brought with it three key difficulties for owners and users of IP. Firstly, the amount of information, presented in the form of web pages identified by Uniform Resource Locators, (URL), is growing much more rapidly than the ability to search and locate what is of interest to the users. There were reportedly 2.1 billion web pages in July, 2000 and they are estimated to be growing at 7 million pages a day. The use of Search Engines, to continuously comb and index the web pages in existence, and Web Directories to index these web pages, has enhanced the ability of users to find the desired information on the I/WWW. However, even the best of search engines now, such as Google, are reportedly only able to search through about 15% to 20% of all available web pages in existence. As a result, a large portion of the IP on I/WWW are out of reach for most users. The current technical attempts to solve the problem by using faster computers and more efficient search engine software are unable to keep pace. Secondly, the widespread initial notion, that information available on the I/WWW should be free, has caused severe distorted development of the I/WWW "ecosystem." This low expectation of revenue from I/WWW users has forced web site operators to rely too heavily on advertising revenue. This in turn caused web sites to be designed primarily for channeling user traffic through slow-loading web pages filled with banner or other advertising. This practice greatly slows down how users can find useful information. Thirdly, even when users have found some useful information on web pages, it is difficult to save the information efficiently. Bookmarks can be used to return to specific web pages, but quite often the content is replaced by newer material, or the web page is deleted due to web site redesign or business failure.

This low expectation of revenue from users in turn caused many leading publishers to refrain from archiving past issues of their journals and newspapers online, in manners that can be accessed and searched by users. Even the 150 year old Scientific American magazine is able to offer today, at relatively high user fee, only archived material back to 1993 for online search and retrieval. Similar situation exists for Time magazine and Harvard Business Report. Most smaller publishers just cannot afford to set up archives. A vast amount of accumulated knowledge is therefore not within the reach of potential users on the I/WWW.

Review of Prior Art

Various existing technologies provide enabling pieces found in the present invention. However, the existing approaches are steeped in the paradigm of physical books and magazines including the following:

(1) Physical clipping of news articles as a paid service for clients may use courier delivery of reprints, faxing of clipped information and emailing of documents;

(2) Many journals such as 'Harvard Business Report' and 'Economists' offer online and offline sale of reprints of articles that appear in the printed publication. They also offer access to their electronic archives although most only cover a small fraction of the rich hardcopy archives;

(3) Databases such as Nexis-Lexis, Delphion, Dow Jones, infotrieve, ebrary and questia allow paying clients to search its proprietary databases and then order downloads, reprints for physical delivery, by fax or by email. The costs to users are typically high due to the small market that these databases reach;

(4) Information on web pages can often be copied and then pasted onto a word processing document for storage, which then needs to be filed and indexed for future reference. More commonly, the Uniform Resource Locators (URL's) of the web pages are 'bookmarked' for later access. However, bookmarking does not allow annotations on the web page and is highly susceptible to 'link rot', where the web page referred to by the bookmark link is no longer available due to deletions, content revisions or business failures;

(5) a new simplified approach is offered by eGem.com wherein information on the web can be copied into files, with an attached bibliographical reference, and then organized into folders;

(6) another simplified way is offered by Clickability.com to bookmark web pages organized into folders. These bookmarks and folders can then be shared with others via email, with short attached notes;

(7) specialized email service is offered by Zaplets.com that allow web pages to be tagged and emailed to other users, so as to start a discussion group on a given subject;

(8) CueCat.com enabies publishers and advertisers to include barcodes on magazines articles and advertisements. Users can buy a bar code reader linked to the personal computer accessing the I/WWW. Scanning a barcode will then automatically link the user's computer to the web site of the publisher or the advertiser;

(9) Companies like Adobe, Microsoft and Palm currently supply software packages That allow users to annotate (highlight, underline, bookmark, add comments and signatures, etc.) a document, and store the document with or without the annotations and/or store the annotation file separately. Importantly, an annotation file is always defined and linked to a specific document. To use the annotation file, the user must have possession of a copy of that document, to apply the annotation file to. These annotation files are intended to be editing and collaboration tools amongst peers and co-workers. While the specific documents being annotated may typically be protected by DRM methods, no consideration is given to, nor provision made for copyright protection of the annotation files, in the context of their potential sale and distribution. Moreover, the annotation files are not intended for linkage to documents that may have only limited rights associated with them, such as view only, etc. No provisions are made to allow linking of these annotation files to keywords, folders or pointers, in order to facilitate future access;

(10) Companies, such as filesanywhere, idrive, xdrive, eBackup provide online storage of files for remote access, typically for a fee. Most offer some free initial storage volume. These are offered typically for private and non-commercial uses and have no provisions for digital rights protection;

(11) Some companies have announced plans to offer solutions to store information in a distributed manner on computers of many internet users, to reduce storage cost; and

(12) New technical development will soon enable ultra high speed optical and wireless access to I/WWW with palm size devices with high resolution and processing power.

Most prior art known to Applicant are related to the various methods and systems to index, search, store, retrieve or synchronize documents and files within an enterprise or via the internet. None of these prior arts and listed patents are related to the essence of the present invention, which provides the assured access to "permanent archives" and the functionally of "Access File", separately, and combined to offer new applications.

In practice, people use IP for either pleasure or reference. Of the uses, the reference use is typically of much higher economic value to the users. The books and journals that readers keep on the shelf typically contain some pieces of precise information that the user would like to make note of and then store in some manner for easy reference at a later time. These users of reference IP incur the efforts and coasts of storage and handling to achieve efficient and assured access to the IP and the ability of users to value add to the IP at a later time. This need for reference and verifiable information is most important and in demand in many professions including legal, medical, academic, political and business. The constantly growing supply of IP also necessitates periodic culling of collections of reference IP owned by individuals, business, libraries and governments, leading to ever increasing loss of access to large amounts of IP, most often irreversibly.

SUMMARY OF THE INVENTION

The present invention teaches certain benefits in construction and use which give rise to the objectives described below. It includes the creation of one or more related or separate Permanent IP Domains within the I/WWW and is used solely for storage, retrieval, indexing and amending of IP. This Permanent IP Domain has the attributes as described in the following.

Printed articles and its readers are used in the description below as an example, but the present invention applies to all IP, including but not limited to those in the forms of written words, graphics, audio, visual, video, multi-media, and I/WWW content. Users of the IP described here include but are not limited to readers, viewers, and listeners.

(A) Permanent Archive

A system of hardware and software including, but not limited to, computer servers, back-up servers, data back-up facilities, and disaster recovery system, banking and payment system, and customer relationship management system is organized to enable archiving, retrieval, indexing and amending of IP. (FIG. 1). IP owners and IP users can access this system, called 'Permanent IP Domain' here for identification purpose, via devices including, but not limited to, enterprise mainframe or server, personal computer, personal digital assistant, web TV, WAP enabled cell phone and dedicated I/WWW access device.

Each IP accepted into this Permanent IP Domain is "permanently archived" under a unique permanent IP identification address (PIPA), and is stored with back-up and disaster recovery capabilities. The "permanent nature" of the archive will be described more fully below.

Each IP accepted for archiving will be stored exactly in the form and with the content submitted. No revision will ever be made to any archived IP in the Permanent IP Domain.

Each IP is archived under a unique Permanent IP Address (PIPA) and has an essential index tag attached to it. This tag will contain information including, but is not limited to: IP type, country of publication, IP name, author name, copyright information, key words, abstract, ISBN number or ISSN number, publication name, publication date, volume and issue numbers, section name, page number, etc., plus file format and file size information, and content ratings for language, violence, age appropriateness, etc. (A view of the Index Tag input screen view on a PC is shown in FIG. 2).

Owners of IP will 'opt-in' on a voluntary basis to join as members of the Permanent IP Domain, agreeing to abide to a specified code of ethics and rules of conduct. Member IP owners are able to register their unique identifying names for easy access. Established publications and registered corporations will be given priority in claiming the use of particular names.

Member IP owners who submit IP for participation in the Permanent IP Domain pay fees for membership and for the archiving costs associated with their IP.

To be acceptable, IP must be of commercial value with the IP owner reasonably expectant of having customers who will pay for access, or have customer relations value with the IP owner paying for the costs of its customers access; or of charitable value, in which case the IP owner or third party benefactors will pay for the costs of access.

IP owners are able to download software from the website of the Permanent IP Domain to prepare the IP for submission (The procedure is shown in FIG. 3) in one of several standard formats such as, but not limited to, Adobe PDF, MS Reader or Palm Reader format. The IP owners can do the conversion of IP into the chosen format, or they can choose to submit the IP through one of the conversion/submission service companies authorized by the Permanent IP Domain.

The software and hardware systems of the Permanent IP Domain will have search capabilities and Digital Rights Management (DRM) built in, using software commercially available, or via technological partnership with other organizations.

The Permanent IP Domain will allow the IP owners to specify the levels of access to each IP and the fee associated with each level of access. These levels include, but are not limited to: one time view only, time limited view only, lifetime view only, view and print only, view/print and download, time based subscription, etc. At the option of the IP owners, the access fees may be waived for certain groups, access levels, and/or for certain time periods. In addition, charitable funding may be arranged to sponsor access to certain categories of IP.

The Permanent IP Domain will allow the IP owners to specify groups of users that are permitted to access the IP, and the level of access permitted for each group. The identity of the users will be user's id and password, plus the option of additional identification capabilities such as, but not limited to, computer id, CPU id, secondary password, smart cards, encoded credit cards and/or 'biometric' identification systems. This capability allows the IP Owners to use the Internet and the IP Domain to 'narrow broadcast' to a selected audience cost effectively around the globe.

The IP Domain will have a revenue sharing arrangement and/or other fee arrangements with the IP owners for the access fees paid by the users.

One key distinguishing and vital feature is the 'permanent nature' of the archive of IP in the Permanent IP Domain. This Permanence is achieved by the establishment of a small endowment fund, associated with each IP, that will generate a perpetual stream of annuity payments (similar to 'life annuity payments' in life insurance industry or perpetual scholarships enabled by an endowment fund), defined through actuary determination and include allowance for contingencies, that will fund and sustain the physical operations associated with the ongoing archiving of each IP. Specifically, the fee paid by an IP owner to archive a specific IP will be set such that a portion of it can be placed into a separate "pool" of trustee managed "archiving endowment trust" that is designed to generate perpetual annuity payments to pay for future depreciation and operating costs associated with the 'archiving' of that IP (FIGS. 4 & 5). The operating costs associated with the retrievals will be separately born by users of the IP and charitable or commercial sponsors. The separation of the trustee-managers of the "endowment trust" from the operators-managers of the Permanent IP Domain is a key design and operating element that will insulate the archive operation from the economic or policy fluctuations and changes of the commercial operation that may endanger the archiving operation's permanence.

This archiving endowment trust may be further augmented, when possible, by donations, grants and allocation of a portion of operating surplus.

This separate trustee managed financial structure that provides the function of permanence to the storage or archiving of IP, has never been explicitly defined, set-up and publicized by any other person or organization in the public domain. There may however have been some implied or implicit arrangements set up by governments, businesses or other organizations, used for internal undisclosed or private applications.

Another distinguishing and vital feature is the accessibility by large number of individual IP owners to this 'pool enabled' function of 'permanent archive'. Similar to the establishment of insurance policy coverage, the benefit to individual participant is possible upon the establishment of a large pool of 'resources and associated risks', with the liquidity increasing and risk profile diminishing with the growth of the participating population. All IP owners joining as members of the Permanent IP Domain will benefit from this function of Permanent Storage. This mode of operation is novel and distinct from any other permanent storage arrangement used to date by individuals or organizations including businesses and government agencies, implied or otherwise.

The IP owners can then include reference to its membership in the Permanent IP Domain in their various forms of publications, including but not limited to newspapers, magazines and web pages, to advise of this additional service feature they are providing to the users. This co-marketing is both a right and a responsibility of the IP owners that will help ensure common success.

Users will join as members for an annual membership fee and have the ability to search the Permanent IP Domain. Upon finding the desired IP and reviewing the abstract and excerpts, the member user may pay the fees specified by the IP owners for one or more of the various levels of access the IP archived in the Permanent IP Domain. The member user can then work on the selected IP using Access Files to be described below.

As the payments associated with accessing each IP will be relatively small, member users will make periodic up-front payments for credit balance of stored value units to be drawn against, in order to minimize handling costs.

(B) Access File

The present invention methods include the creation of a small and efficient "Access File" enabling users to reference and work with each IP stored. Each Access File contains the unique permanent IP Identification Address (PIPA) for the IP of interest, plus additional information such as user's identity and user-defined key words. It also contains value added information such as annotations, highlights, bookmarks, attachments. etc. applicable to the IP, (which may be a 300-page research report), but is a small and efficient file because it does not have to contain the sizable IP itself. (FIG. 6)

This Access File, with its unique Access File Identification Code (AFIC), can be stored in user's folders and/or be emailed to a recipient. It is itself now a new secondary class of Intellectual Property.

The Access File, whenever opened, will access the specific referenced IP in the Permanent IP Domain and apply all the value-added information to it, before presenting the combined product to the user. This Access File can be added to and modified by another user, and becomes another new Access File with a new Access File Identification Code, and so on. A generation code component will be included in the AFIC to indicate the number of generations of added value that have been added to the Access File.

Users of the Permanent IP Domain will be able to store the Access Files in folders and link each one to any number of projects, subjects, dates, people etc. to facilitate future access. (FIGS. 7A–7G)

This Access File collection can be synchronized and updated amongst a myriad of internet access devices owned by the user, including but not limited to personal computers, personal digital assistants (PDA's) and WAP enabled cellular phones using software provided by the Permanent IP Domain.

Users are able to start an Access File by adding in only partial information such as journal name, issue date, title or other key words, using drop down menus, keying or other methods, on personal computer (PC), PDA's and other devices, while online or offline. Once the PC, and the PDA directly or via synchronization with the PC, logged onto the Permanent IP Domain, the software will enable users to quickly download the full PIPA associated with the IP and add 'value-add' information such as annotation etc. to the resulting Access File. (FIG. 6).

The owner of an Access File may choose to submit the Access File to the Permanent IP Domain for further archiving and for paid or free access by others, thus becoming part of a valuable new class of secondary IP.

The technical and financial arrangements for the Permanent IP Domain and the functionality of the Access File together ensure the efficient search for and "assured permanent accessibility" of the potentially vast pool of IP, plus the ability to index and amend the IP found.

Additional Funtionalities and Benefits of (A) and (B) Combined

The fact that IP archived in this Permanent IP Domain has assured accessibility, plus the functionality of the "Access Files", allow most 'reference users' of IP to avoid keeping physical copies of these IP in the user's possession. These copies are in various forms, including but not limited to: books, journal, magazines, newspaper, photocopy, photograph, audio tape, video tape, laser disc, compact disc, video compact disc, digital video disc, mini-disc, floppy disc, zip drive disk, compact flash card, smart media card, memory stick, hard disc space and computer tapes. Significant savings will result from not needing to physically provide for the space, furniture, maintenance associated with these physical storage media. These costs savings will easily justify the small fees associated with the use of Permanent IP Domain and the Access Files.

The compact size of the Access File's further allow its use as the standard format in bibliographical reference for research reports, journal articles etc. Widespread use of Access File's or even just the Permanent IP Address (PIPA) will dramatically improve the speed, authenticity and usability of information flow, by allowing readers to immediate access the original source documents of quoted information, for verification or for reviewing specific details.

The creation of this Permanent IP Domain where IP owners voluntarily join as paying members to contribute only P deemed to be worth paying for, will significantly reduce the amount of information that needs to be searched by the search engines. (FIG. 8)

The additional information from the 'indexi tags' will further enhance the efficiency of searches for relevant on the I/WWW. At the same time, the Permanent IP Domain will be much larger, more open and inclusive than the various private commercial reference databases now available.

The commercial proposition for the IP Owners of the potential of significant economy of scale and vast market reach will be attractive. The profit potential and the possible loss of it then encourages members to voluntarily observe of the codes of ethics and rules of conduct, including proper labeling or rating of audio, visual and video material for language and violence, etc according to specified acceptable standards. It will also create the ability to exclude inappropriate material such as those related to terrorist activities and hate crimes.

Wide spread adoption of this IP archiving, retrieval, indexing and amending system will significantly lower the pro rata capital cost required for each IP, and bring true economy of scale to IP storage and retrieval. This will lead to lower cost access to information for the masses and help eliminate the "digital divide" based on affordability.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a block diagram of a hardware system useful for the invention method;

FIG. 2 is a diagram of an index tag input screen thereof;

FIGS. 3a and 3b are flow diagrams of an IP owner's submission thereof illustrated on two sheets;

FIGS. 4 and 5 are diagrams defining an endowment fund element of the invention;

FIGS. 6 is a diagram of an Access File information thereof;

FIGS. 7A-2 are diagrams defining various access methods in use thereof illustrated on two sheets;

FIGS. 7B to 7G are diagrams which more specifically illustrate the five access methods set forth in FIGS. 7A-1 and 7A-2.

DETAILED DESCRIPTION OF THE INVENTION

Figure 3A:
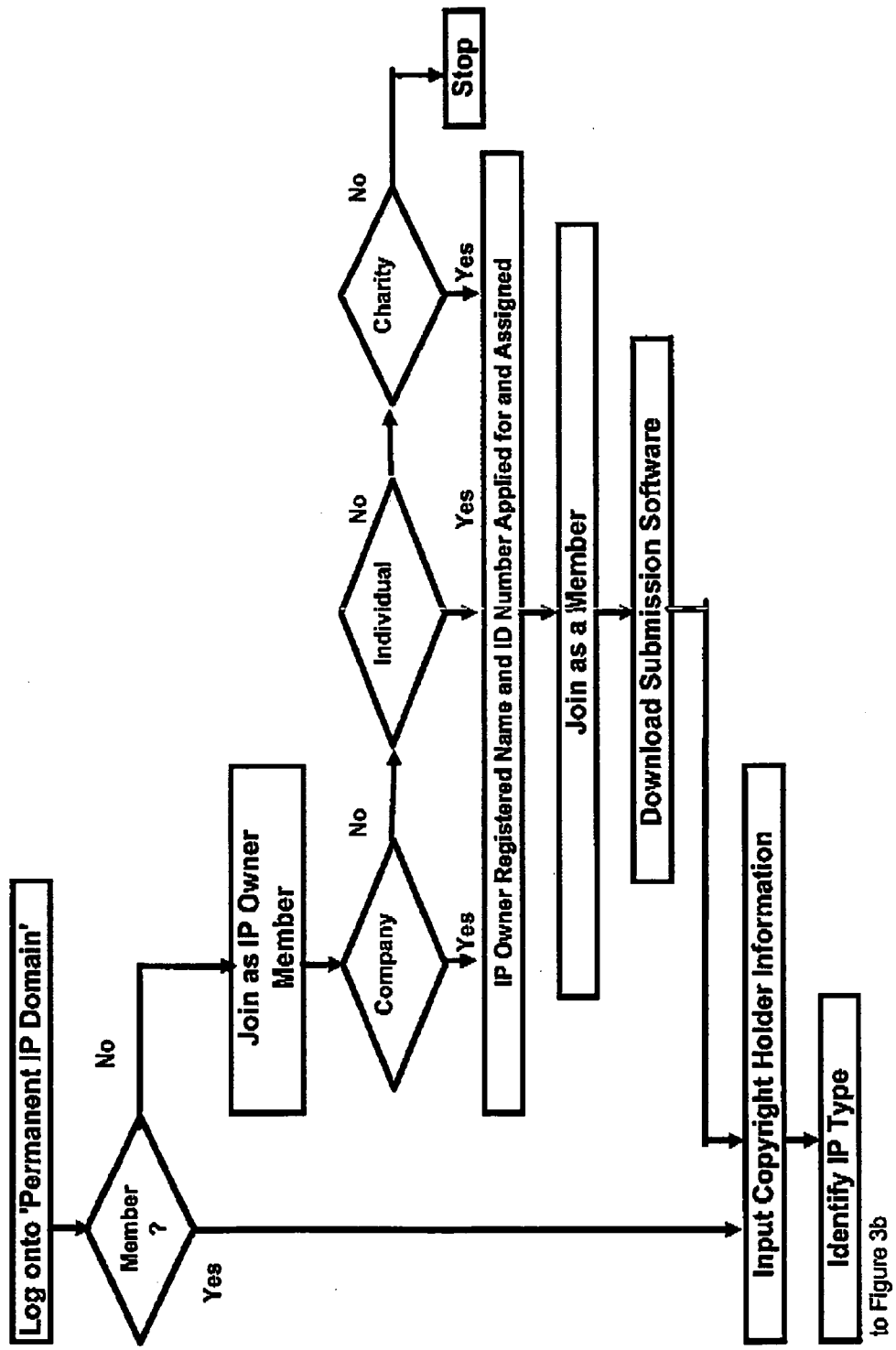
Figure 7D:
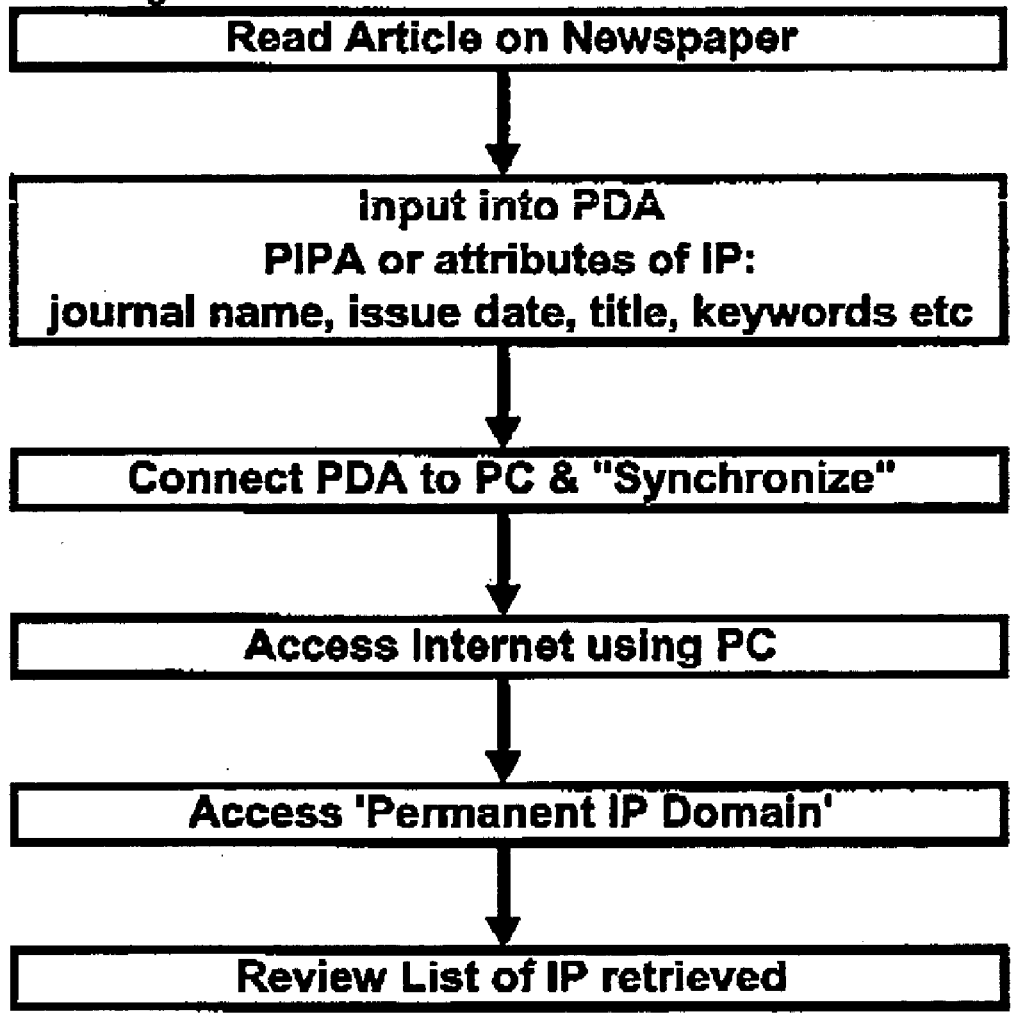
Figure 7F:
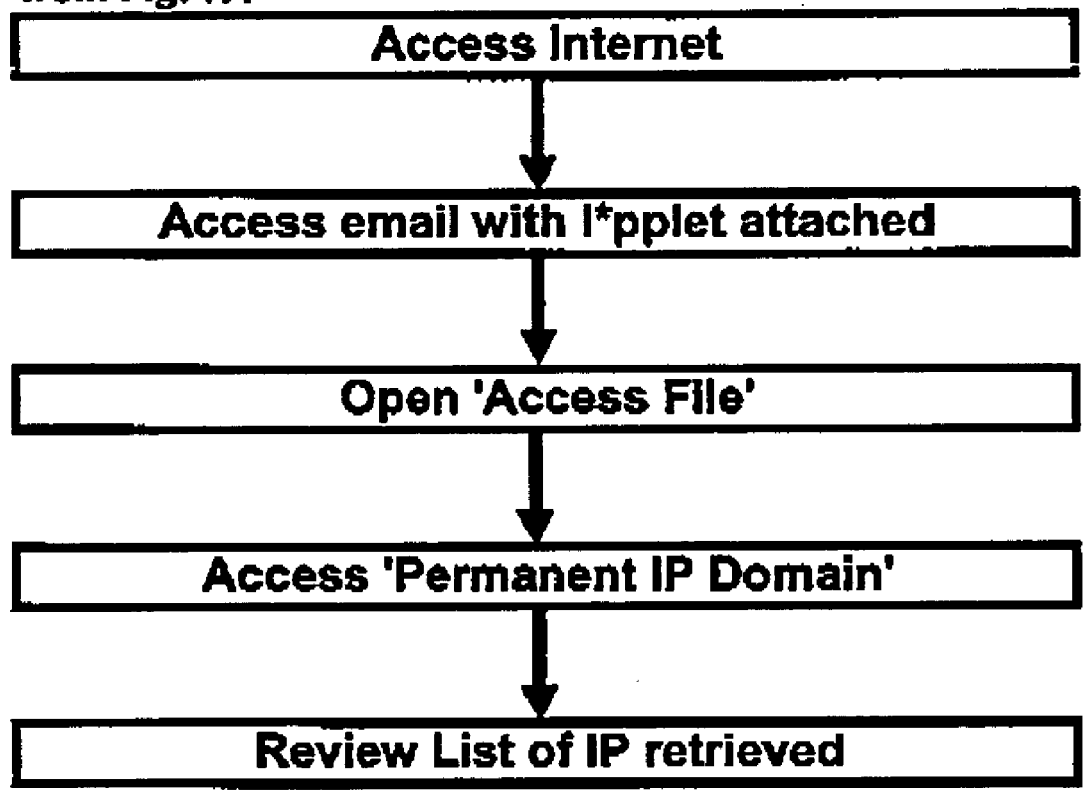
Figure 7G:
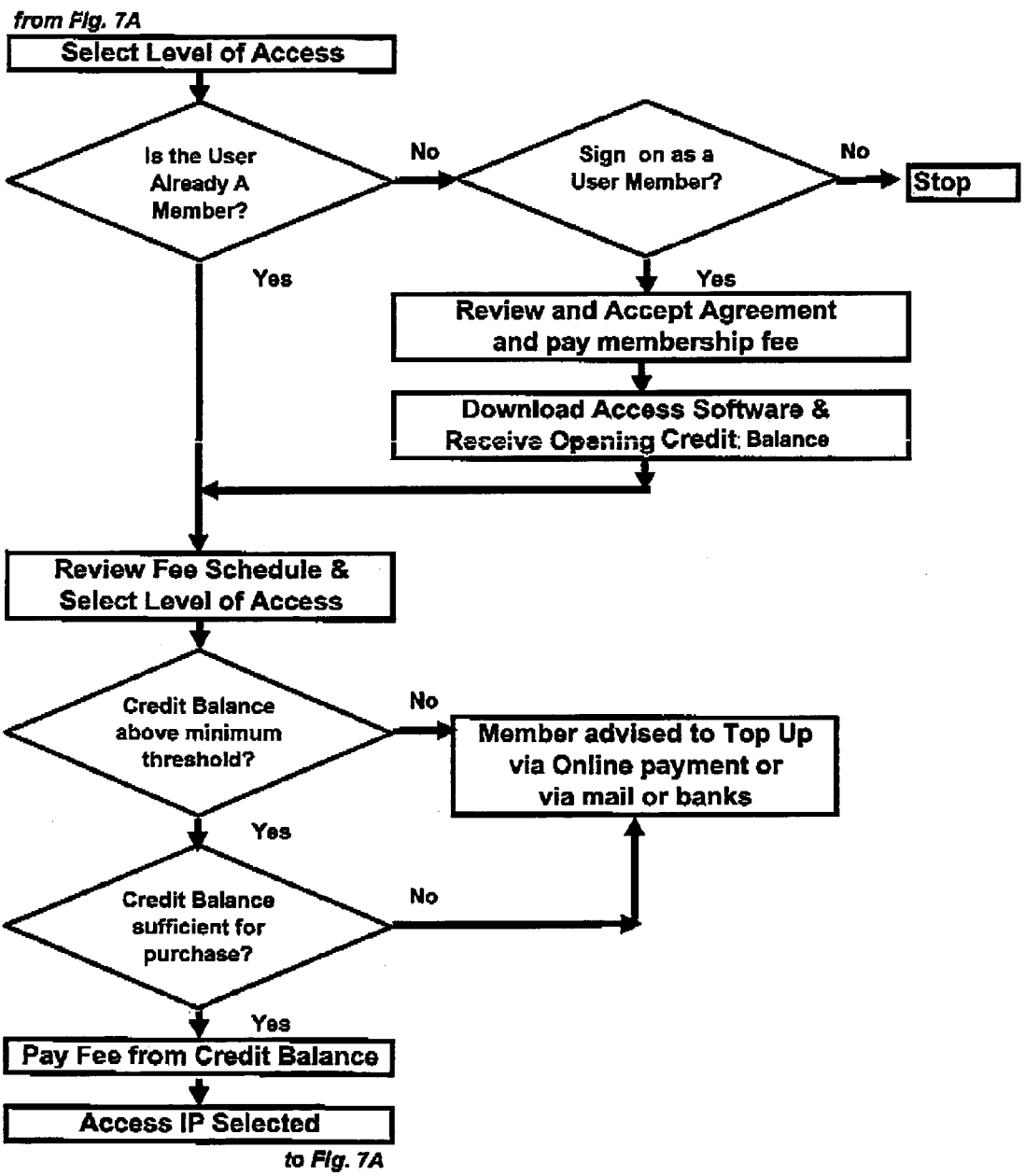
Figure 8:
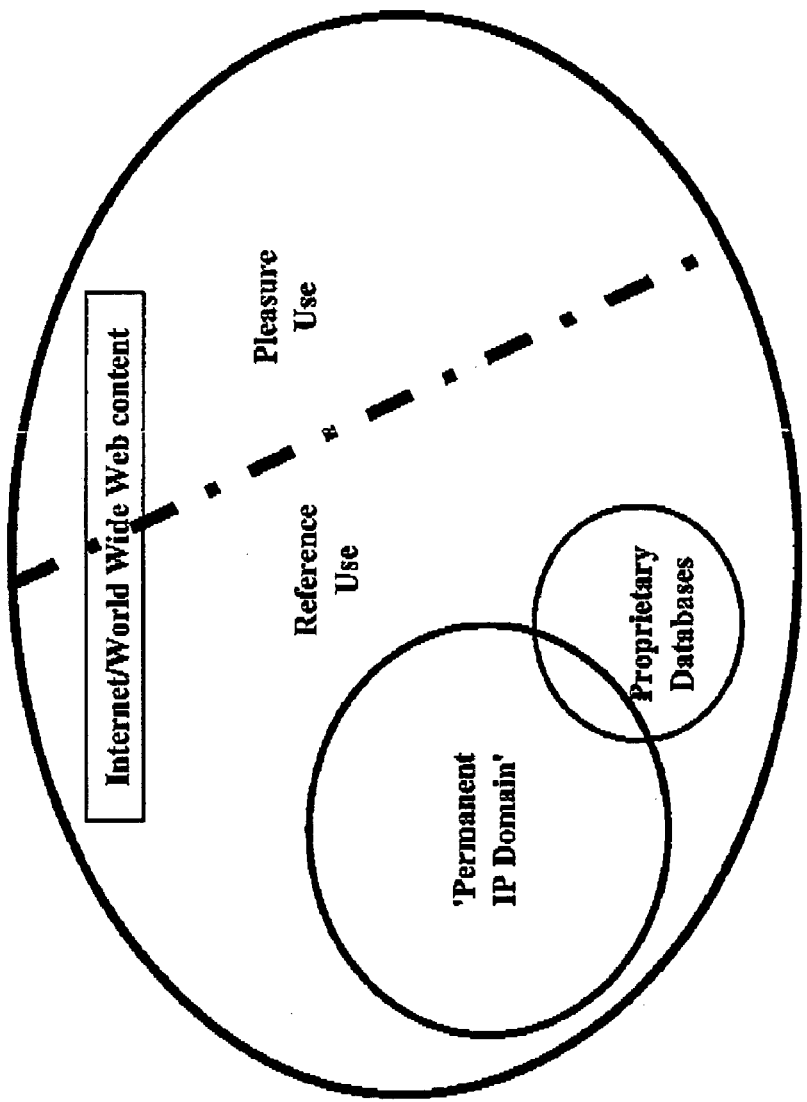
FIG. 8 is a diagram showing the relationship between the present invention and the -available information on the Internet.

The above described drawing figures illustrate the invention in at least one of its preferred embodiments, which is further defined in detail in the following description.

This invention has very broad application and will fundamentally improve and enhance the ways that IP are accessed and used throughout the world. One hundred and eight (108) preferred embodiments are outlined in Chart A, to illustrate the breadth of applications They are prioritized by Public Benefit, but the Expected Usage, Usage Type and the alphabetical item number for each preferred embodiments are also identified. Four of the preferred embodiments with the high Public Benefit and high Expected Use are summarized below to illustrate the four main Usage Types that in which the Permanent IP Domain and the Access File can be used:

Usage Type A

A Preferred Embodiment: Annual and Quarterly Corporate Reports:

Publicly listed companies are required by securities regulations to publish annual and quarterly reports to their shareholders. These typically contain valuable information to the investors, bankers and investment analysts, and to corporate employees. Each user may wish to annotate and retain one or more different portions of the report for future reference. However, due to the bulk of these reports, most of these reports are typically kept for one or two years, at most. This contributes much to the loss of accumulated wisdom in the business and investment community, and keeps in depth research out of reach of most investors.

Corporations can keep publishing the Annual and Quarterly Reports, and in addition submit a copy in Adobe PDF, 'MS Reader' or other formats to the Permanent IP Domain for permanent storage. The company will join as an IP owner member, with its unique member id, and pay applicable archiving fee for each IP submitted. Each IP submitted will be properly tagged and assigned a unique permanent IP identification address (PIPA). The company can then use the unique Permanent IP Domain logo and explanatory notes to advise readers of the new added feature. As a service to the investing public, the company may decide to not charge any user fee, and pay the Permanent IP Domain fees to cover the costs associated with access. In return, the company may wish to get traffic reports related to a users' access.

The investors, bankers, investment analysts and corporate employees can access the Annual and Quarterly reports, directly or after receiving the printed hardcopy. After accessing the Permanent IP Domain on the I/WWW, and signing up as members, they can access the particular pages of information of interest, make comments/annotations and keep a copy of the small 'Access File' file in various folders of interest. They can also email the Access File to a colleague who can then immediately access the exact same report plus the sender's comments just by opening the Access File. The recipient can further add comments/annotation can create a second generation Access File for efficient filing and transmission.

As higher resolution displays for PC's, PDA's and other Internet access devices, and high capacity transmission becomes more available, and as the use of Permanent IP Domain and Access File become prevalent, corporations will be able to, at the option of its shareholders, avoid sending printed hardcopy Annual and Quarterly reports to many of its shareholders, thus reduce communication costs and environmental impact.

Usage Type B

A Preferred Embodiment: Web page content

Many web pages contain reports or information that is useful for future reference. Users typically 'bookmark' these. Web sites therefore often have to maintain old web pages at the costly servers in order to provide continuous access by users, or replace the pages and render the users' bookmarks useless. Users can also email the report to themselves or cut and paste it to a word processing software for future reference. All of these options are inefficient, may involve copying of very large files to user's computer, and most do not allow annotation on the content.

A Web page owner, corporate or individual, such as ABC.com or National Post newspaper, can join as member of the Permanent IP Domain and be assigned its unique member id. It will pay a fee to submit the web page content for archiving. It will provide the required 'index tag' information, and specify the various allowable levels access and associated fees within the revenue sharing structure. Upon completion, it will be allowed to use the "Permanent IP Domain" unique logo to advise its web users of the availability of the new access feature. Software can then be downloaded to add special buttons for easy access from the web page to the Permanent IP Domain and the specific stored IP. The IP owner member will receive payment for his share of the revenue periodically upon reaching some administrative thresholds. It will also receive analysis of the users traffic if subscribed for.

A web page user will be able to click on the "Permanent IP Domain's" unique 'button' located on the web page and access the Permanent IP Domain. Upon signing up as a member using downloaded files, and payment for 'points' or 'purchase credit' into his account, the IP users will be able to call up the IP referred to. He can then decide the level of access he wishes to have for this particular piece of IP: view only, view and print copy, view, print and download, or others, in relations to the fees payable. The small fee payable will be deducted from his account, which the member user will be reminded to top up periodically, with offline or secured online payments.

Usage Type C

A Preferred Embodiment: Newspaper, Magazine and Journal Articles

Many newspapers, magazines and journals, such as 'New England Journal of Medicine', 'Nature' and 'New York Times', publish well researched articles and reports that are often quoted in subsequent works of others However, the publishers (IP owners) receive minimal "residue revenues" from these IP, beyond the initial sale The lack of profitability in turn led to minimal archiving of the IP. On the other hand, readers of these publications often wish to retain some reports, or parts of some, for future reference. They typically keep the physical copy of the journal on shelves, keep pages cut from the journal in folders, or keep photocopies of it in folders. These then have to be indexed, cross-referenced and stored to enable later retrieval. The tedium and costs of this exercise often far out weight the potential benefits of good references.

This group of IP owners can join as members of the Permanent IP Domain and benefit from the shared capital costs, economy of scale and pooled operational expertise. They will agree to abide to the terms and conditions of the Permanent IP Domain and pay membership fee plus fees to submit the printed content in acceptable formats to Permanent IP Domain for archiving. They will also provide for each submitted IP, the required 'index tag' information, and specify the various allowable levels access and associated fees within the revenue sharing structure. Upon completing these steps, they will be allowed to use the Permanent IP Domain's unique logo to advise its web users the availability of the new access feature. The IP owners will get a share of the revenue generated from users fees, to be disbursed periodically upon reaching some administrative thresholds. They will also receive analysis of the user's traffic if subscribed for.

A reader can access the archived IP on the Permanent IP Domain in two ways.

(1) He can write down with pen and paper, 'skeleton' key information such as publication name, issue date, page number, full or partial title, author name or other distinctive keywords. Later, he can log on the Permanent IP Domain on the I/WWW, and after signing on as an 'IP user member', access the specific IP by inputting the particulars. The domain will present the title and summary information of the specific IP for review. Upon deciding what level of access and paying for it, the user can access the IP and create an Access File. The Access File may include comments, bookmarks, highlighting, underlining, etc. He can then store this Access File on his computer and link it to a number of folders of interest, and/or email it to a colleague for further review.

(1) He can note this 'skeleton' key information on a Personal Digital Assistant (PDA) such as a Palm or an iPAQ (PDA available from Compaq USA). Later, he can use a charging/synchronization cradle or cable to connect the PDA to his PC that is linked to the Internet. After he signs on via his PC to Permanent IP Domain as a member, a software 'plug-in' provided to him in the membership package will automatically synchronize the 'skeleton' Access File information between the PC and the PDA. The software will also used this new 'skeleton' key information to search the -Permanent IP Domain and download the corresponding Permanent IP Addresses (PIPA) to create new Access File's. The user can then review and access these IP and embellish the Access File as appropriate. Upon completing his review, he can synchronize the folders of Access File between his PC and his PDA.

In both cases, the user may opt to subscribe to additional service on the Permanent IP Domain to establish as a back-up, a secured online copy of selected Access File folders contained in his PC. This copy can be synchronized amongst the online back-up, the PC, and the PDA, if applicable.

Furthermore, if any newly created Access File is deemed to be of significant intellectual value, the user may then decide to submit, as an IP owner, the Access File as a new IP for archiving, and sale in the Permanent IP Domain.

Usage Type D

A Preferred Embodiment: Medical Procedure: taught by prominent surgeon via video.

In the area of medical training and development, video recordings are often used to teach new medical procedures and techniques. These provide greater reach than having observers above the operating theatre. The use of a video recording archived in the Permanent IP Domain, coupled with verbal and/or written comments from leading experts in the field using the Access File, will enable fast and efficient dissemination of the information. Consistency of information is ensured using one single version of the permanently archived IP (video recording)and wide distribution is made possible by sending the small Access Files through the Internet. The learners will all enjoy the benefit of 'assured permanent access' to the teaching material, without the tedium of physical storage of books and tapes, and the ability to add comments and other annotations to track progress, all in his own small and efficient Access Files stored in his PC or PDA.

The present invention is a technical and commercial method of managing information comprising the steps of: providing an information archiving, retrieval, indexing and amending system containing plural intellectual property included for a fee; enabling access to the information storage and retrieval system by users through an electronic communications network for a fee; grading and indexing the submitted intellectual property; grading the users according to access privilege; creating and associating an Access File for each user; searching the system for intellectual property meeting said user's criteria; associating each Access File with selected intellectual property; amending the said intellectual property with said Access File; storing said Access File separate from the intellectual property; and indexing the said Access File by a set of user defined keywords, linkages and attributes; whereby the said Access File and the said intellectual property may be located more easily.

Preferably, the system comprises interconnecting for operation: a main server, a mirror server, an operational backup system, a disaster recovery system, connection to the Internet and thereby to at least one of: main frame computers, personal computers, personal digital assistants, web TV sets, WAP cell phones, and dedicated Internet connections.

Preferably, the intellectual property indexing step comprises assembling information taken from the aspects list of: intellectual property type, country of publication, author name, assignee, revenue sharing ratio, bank account, keywords, abstract, excerpts, ISBN number, ISSN number, publication date, volume number, issue number, page number, file format, file size, language rating, and violence rating (FIG. 3).

Preferably, the access enabling step comprises at least one of the further steps of: reviewing a list of intellectual property retrieved, selecting specific intellectual property to access, selecting a level of access, paying an access fee, receiving the selected intellectual property, and amending the said intellectual property using the Access File.

Preferably, the access level selecting step includes at least one of the further steps of: determining if user is a member, signing user as member, accepting agreement, paying membership fee, downloading access software, receiving open credit balance, reviewing fee schedule, selecting level of access, and paying further search and retrieval fees. (FIG. 6G)

Preferably, the access level selecting step includes at least one of the further steps of: determining if the user has been granted permission, by the owner of the archived IP, to access to the selected IP. The identity of the users may be verified using methods such as, but not limited to, user id, password, computer id, CPU id, secondary password, smart cards, encoded credit cards and/or 'biometric' identification systems.

Preferably, the storage or archiving system is financed through a separately managed endowment trust, aggregated from individual intellectual property archiving fees collected, said trust providing enduring funding for maintenance and operation of the storage system to assure continued availability of the collection of intellectual property.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A technical and commercial method of managing information comprising the steps of:
 operating an information storage and retrieval archival system containing plural archived intellectual property (IP);
 receiving IP for archival in the information storage and retrieval archival system;
 collecting an archival fee for each archived IP accepted for archival;
 enabling a user fee based access to the archived IP in the information storage and retrieval archival system by users through an electronic communications network;

establishing a separate endowment fund for each archived IP from the archival fee collected for that archived IP; and managing the endowment fund separately from the operations of the information storage and retrieval archival system, wherein each endowment fund generates enduring funding for the maintenance and operation of the information storage and retrieval archival system to assure continued availability of the corresponding archived IP regardless whether there is user fee based access thereto.

2. The method of claim 1 wherein the method comprises the further step of interconnecting for operation: a main server, a mirror server, an operational backup system, a disaster recovery system, connection to the Internet and thereby to at least one of: main frame computers, personal computers, personal digital assistants, web TV sets, WAP cell phones, and dedicated Internet connections.

3. The method of claim 1 wherein the indexing step comprises assembling information taken from an aspects list of: intellectual property type, country of publication, author name, assignee, revenue sharing ratio, bank account, keywords, abstract, excerpts, ISBN number, ISSN number, publication date, volume number, issue number, page number, file format, file size, language rating, and violence rating.

4. The method of claim 1 wherein the receiving instructions for access step comprises at least one of the further steps of: reviewing a list of archived IP retrieved, selecting specific intellectual property to access, selecting a level of access, paying an access fee, and receiving the selected intellectual property.

5. The method of claim 1 wherein the receiving instructions for access step includes at least one of the further steps of: determining if the user is a member, signing the user as member, accepting agreement, paying membership fee, downloading access software, receiving open credit balance, reviewing fee schedule, selecting level of access, and paying further search and retrieval fees.

6. The method of claim 5 wherein the receiving instructions for access step includes at least one of the further steps of:

determining if the user has been granted permission, by the owner of the archived IP, to access to the selected IP; and verifying the identity of the user using at least one of user id, password, computer id, CPU id, secondary password, smart cards, encoded credit cards and biometric identification systems.

7. The method of claim 1 further comprising the step of establishing a Permanent IP Identification Address (PIPA) for identifying the address of the archived IP in a Permanent IP Domain (PIPD).

8. The method of claim 7 wherein the funding of the endowment fund step further comprises the steps of:
managing the PIPD by operator-managers; and
separately managing the endowment trust from the management of the PIPD.

9. The method of claim 8 further comprising the steps of:
augmenting the endowment fund for the archived IP with donations, grants or operating surplus.

10. The method of claim 8 further comprising the steps of:
pooling endowment funds for a plurality of archived IP for increased permanence including increased liquidity and reduced risk.

11. The method of claim 7 further comprising the steps of:
establishing one or more access files separate from the archived IP, each access file associated with a user;
enabling access to an access file by a user wherein each access file comprises the PIPA for the archived IP, an identity of the user, and value-added information by the user.

12. The method of claim 11 further comprising the steps of:
accessing a user's access file by the accessing user;
combining the value-added information and the archived IP into a combined product; and
presenting the combined product to the accessing user.

13. The method of claim 11 further comprising the steps of:
accessing a first user's first access file by a second user for forming a second access file:
combining value-added information of the first and second access files and the archived IP of the into a combined product; and
presenting the combined product to the second accessing user.

14. The method of claim 11 wherein a user accesses archived IP further comprising the steps of:
opening an access file; and
obtaining a presentation of the combined product Including at least the PIPA for the archived IP and the permanently archived IP associated therewith.

15. The method of claim 11 further comprising the steps of:
initiating the creation of an access file by a user by the entry of information associated with the archived IP; and
once the archived IP is identified, the PIPA for the archived IP, an identity of the user, and value-added information by the user can be added to the access file.

16. The method of claim 11 wherein a user accesses archived IP further comprising the steps of:
searching a plurality of access files to ascertain if archived IP is stored for retrieval; and if so
opening the access filed associated with the archived IP for obtaining a presentation of the combined product including at least the PIPA for the archived IP and the permanently archived IP associated therewith.

17. The method of claim 11 further comprising the step of backing up the access file on the storage and retrieval archival system operated in the PIPD.

18. The method of claim 7 wherein the amount of archived information for review by a user is minimized and wherein:
IP owners fund an endowment fund for the archived IP; and thus only IP selected and funded by IP owners are archived in the PIPD.

19. The method of claim 7 further comprising the step of establishing an index tag for each archived IP and comprising at least a PIPA for the archived IP, the index tags being useful for indexing purposes.

20. The method of claim 1 wherein the funding of the endowment fund step further comprises the steps of:
assessing an archival fee associated with archived IP sufficient to fund the endowment fund for the archived IP; and
receiving the archival fee from an IP owner of the archived IP.

21. A technical and commercial method of managing information comprising the steps of:

operating an information storage and retrieval archival system containing plural archived intellectual property (IP);

receiving IP for archival in the information storage and retrieval archival system;

collecting an archival fee for each archived IP accepted for archival;

enabling a user fee based access to the archived IP in the information storage and retrieval archival system by users through an electronic communications network; and establishing a separate endowment fund for each archived IP from the archival fee collected for that archived IP;

wherein each endowment fund generates enduring funding for the maintenance and operation of the information storage and retrieval archival system to assure continued availability of the corresponding archived IP regardless whether there is user fee based access thereto.

* * * * *